INVENTOR.
SAMUEL L. SEYMOUR
BY Chisholm and Spencer
ATTORNEYS

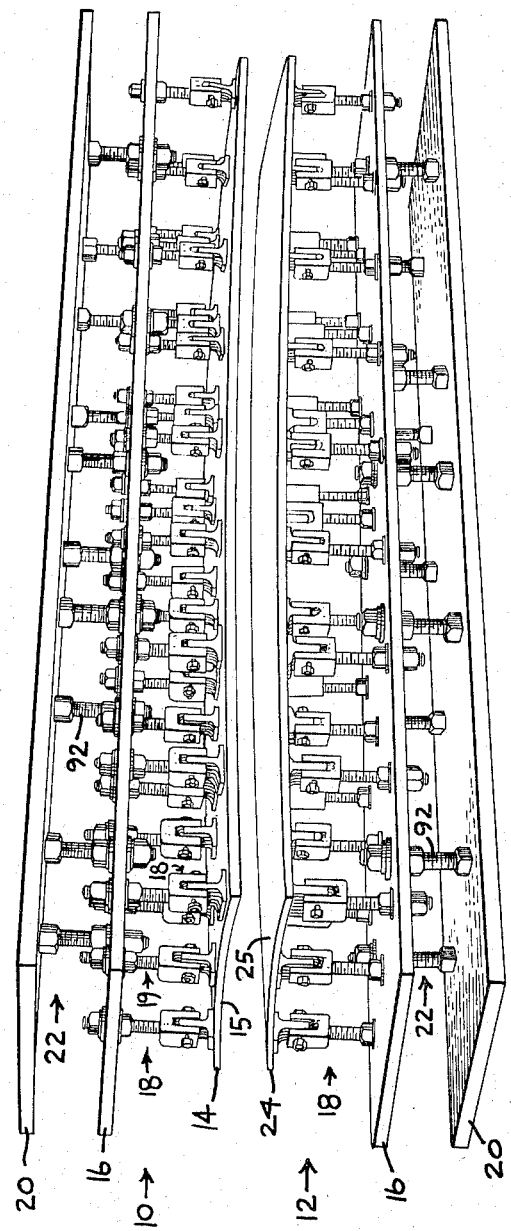

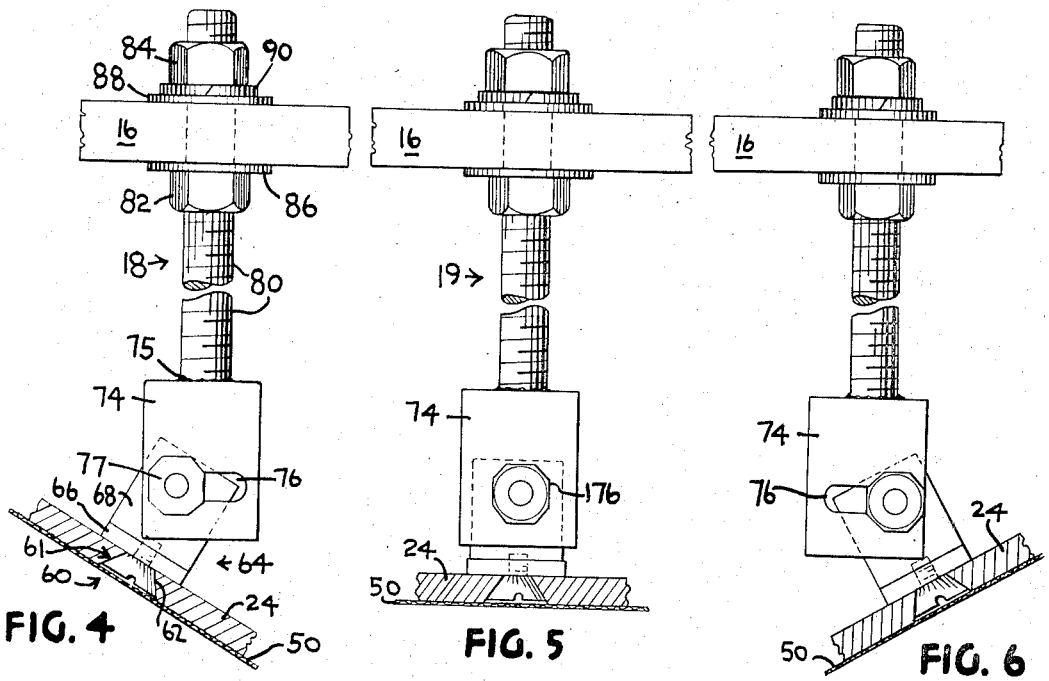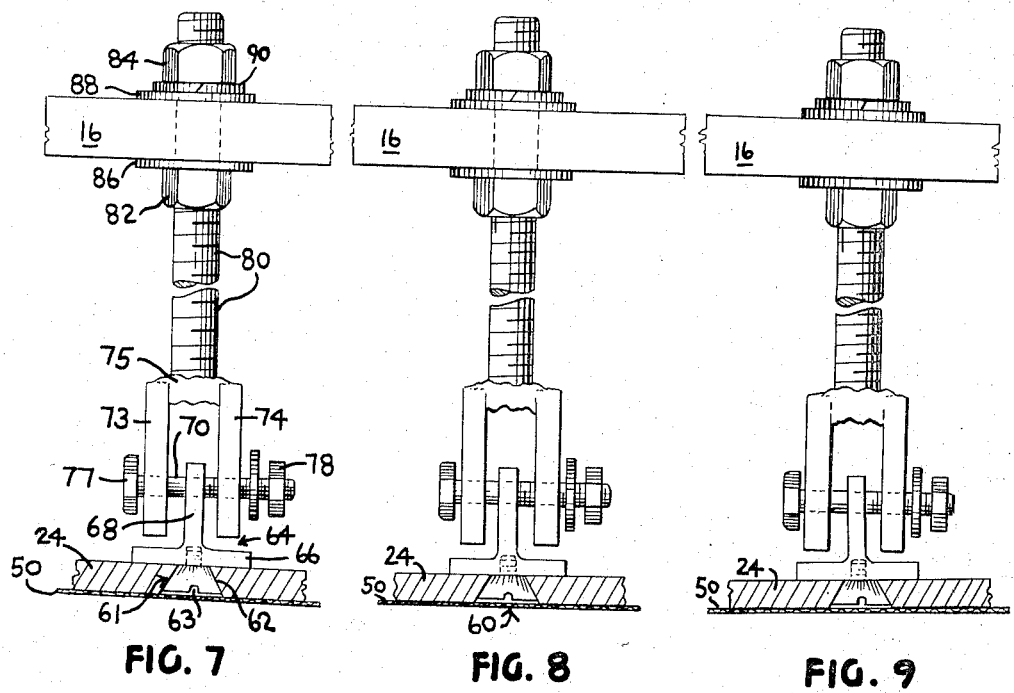

United States Patent Office 3,367,764
Patented Feb. 6, 1968

3,367,764
GLASS SHEET PRESS SHAPING APPARATUS WITH MEANS TO ADJUST THE PRESSING SURFACE CURVATURE
Samuel L. Seymour, Oakmont, Pa., assignor to Pittsburgh Plate Glass Company, Pittsburgh, Pa., a corporation of Pennsylvania
Filed Dec. 15, 1964, Ser. No. 418,430
7 Claims. (Cl. 65—291)

ABSTRACT OF THE DISCLOSURE

In complementary pressing molds for shaping glass sheets a mold comprising a relatively flexible metal plate having a shaping surface complementary to that of said other mold, a relatively rigid member and means connecting said plate in spaced relation to said rigid member including centrally disposed attachment members for fixing said relatively flexible plate in a position of alignment with said rigid member and connecting members individually adjustable between said plate and said rigid member for altering the shape of the relatively flexible metal plate relative to the relatively rigid member, said jointed connecting members being constructed and arranged with two degrees of freedom of movement to permit said relatively flexible plate to expand and contract thermally relative to said relatively rigid member.

The present invention relates to shaping glass sheets and particularly to an apparatus for shaping glass sheets by a press bending operation that is relatively inexpensive to fabricate, yet capable of producing bent glass sheets on a mass-production basis within precise tolerances. Though the present invention originated to solve problems existing in the shaping of glass sheets, it is understood that the principles of the present invention may be employed for shaping sheet material other than glass.

Glass sheets or plates have been bent by supporting the sheet to be bent between a pair of glass shaping members while at a temperature sufficiently high to be deformable by pressurized contact between a pair of glass shaping members having major, complementary shaping surfaces conforming to the shape desired for the bent glass. In the past, the glass shaping members were of either solid metal or refractory members or outline metal members covered with suitable material to insulate the glass from direct contact with the metal so as to avoid chill cracking. Unless both opposing surfaces of the glass were engaged throughout substantially equal areas, the opposite surfaces of the glass were cooled unequally, thus imposing a thermal stress causing the glass to distort from the shape imposed by the shaping members as it cooled to uniform temperature subsequent to the bending and shaping operation.

If the glass is contacted around its marginal portion only as disclosed in British Patent No. 880,115 to St. Gobain, only the shape of the marginal edge is controllable within tolerance. The shape of the interior portion is not controlled.

If a pad engages one surface only of the heat-softened glass interiorly of a pair of opposing frames to help form the central portion of the heat-softened glass as disclosed in U.S. Patent No. 3,123,459 to Hens, the opposite surfaces of the glass cool at different cooling rates. The differential cooling of the opposite glass surfaces, one of which contacts the pad and the other of which is exposed simultaneously to air, causes the thermal warpage described hereinabove as the glass sheet cools to a uniform temperature.

Glass shaping members fabricated of solid metal are costly to fabricate. The fabricated parts are not suitable to produce patterns other than the one for which they are originally made, except for a family of glass sheets of uniform radius of curvature but of different sizes.

The purpose of the present invention is to provide glass shaping apparatus of the press bending type that engages the opposite surfaces of the glass substantially equally during the shaping operation, that is easily adjustable to change its shape in the event glass is bent slightly out of tolerance without requiring dismantling of the entire apparatus, and that is capable of simple adjustment to produce several different configurations that are not too dissimilar from one another.

The present invention provides apparatus for bending a heat-softened glass sheet by sandwiching a glass sheet in pressurized engagement between glass facing surfaces of a pair of glass shaping members having major, complementary shaping surfaces conforming substantially to the shape desired for the bent glass sheet and relatively movable between a retracted position and a glass engaging position.

Each glass shaping member of an illustrative embodiment of the present apparatus comprises a relatively flexible shaping plate of metal having a pressing face whose shape approximates that of the shape desired for the glass sheet after bending. The relatively flexible shaping plate extends substantially continuously throughout substantially its entire extent and has sufficient rigidity to resist deformation during pressurized engagement against a heat-softened glass sheet.

The apparatus also comprises a relatively rigid member in the form of a metal plate having an area at least substantially coextensive with that of the relatively flexible metal plate located in spaced relation behind said relatively flexible metal plate. Attachment means is distributed throughout the extent of the relatively flexible metal plate and the relatively rigid metal plate for connecting the plates in spaced relation to one another, for insuring positive alignment of the central portion of the shaping plate to the corresponding portion of the rigid plate while permitting the shaping plate to expand thermally without distorting from its desired local configuration, and for making slight alterations in the shape of the relatively flexible metal plate without altering the configuration of the relatively rigid metal plate. The space between the shaping plate and the rigid plate permits access to adjust the attachment means. Such adjustment changes the local contour of the shaping plate by altering the distance between the shaping plate and the rigid plate in the vicinity of the attachment means.

In a particularly desirable embodiment of the present invention, the attachment means comprises a plurality of jointed members, each comprising a first connecting member rigidly attached to one of said plates and extending toward the other of said plates and a second connecting member rigidly attached to the other of said plates and extending toward said one of said plates. Means couples each of the first connecting members to a corresponding second connecting member in limited pivoting relation thereto about at least one axis transverse to an axis normal to the plane of said rigid plate. The jointed connecting member is rigid along said axis to help rigidify the shaping plate. Its freedom to pivot enables the shaping plate to expand and contract in response to temperature variations more extensive than those to which the rigid plate is subjected during a mass-production bending operation with minimum distortion to either.

In order to understand fully the present invention, a description of a particular embodiment thereof will now be described.

In the drawings which form part of the description of this illustrative embodiment and wherein like reference numerals refer to like structural elements, FIG. 1 is a fragmentary end elevation of an embodiment of the present invention with its cover member partially removed showing how the glass shaping member is attached to actuating mechanism;

FIG. 3 is an exploded view of a pair of shaping members, one having a convex pressing face, the other having a concave pressing face, showing how the elements are attached to one another to provide the results of the present invention;

FIGS. 4 through 9 are various views of the attachment means showing how a typical pair of connecting members forming an attachment means are permitted relative swivelling movement with respect to one another.

Figure 1:
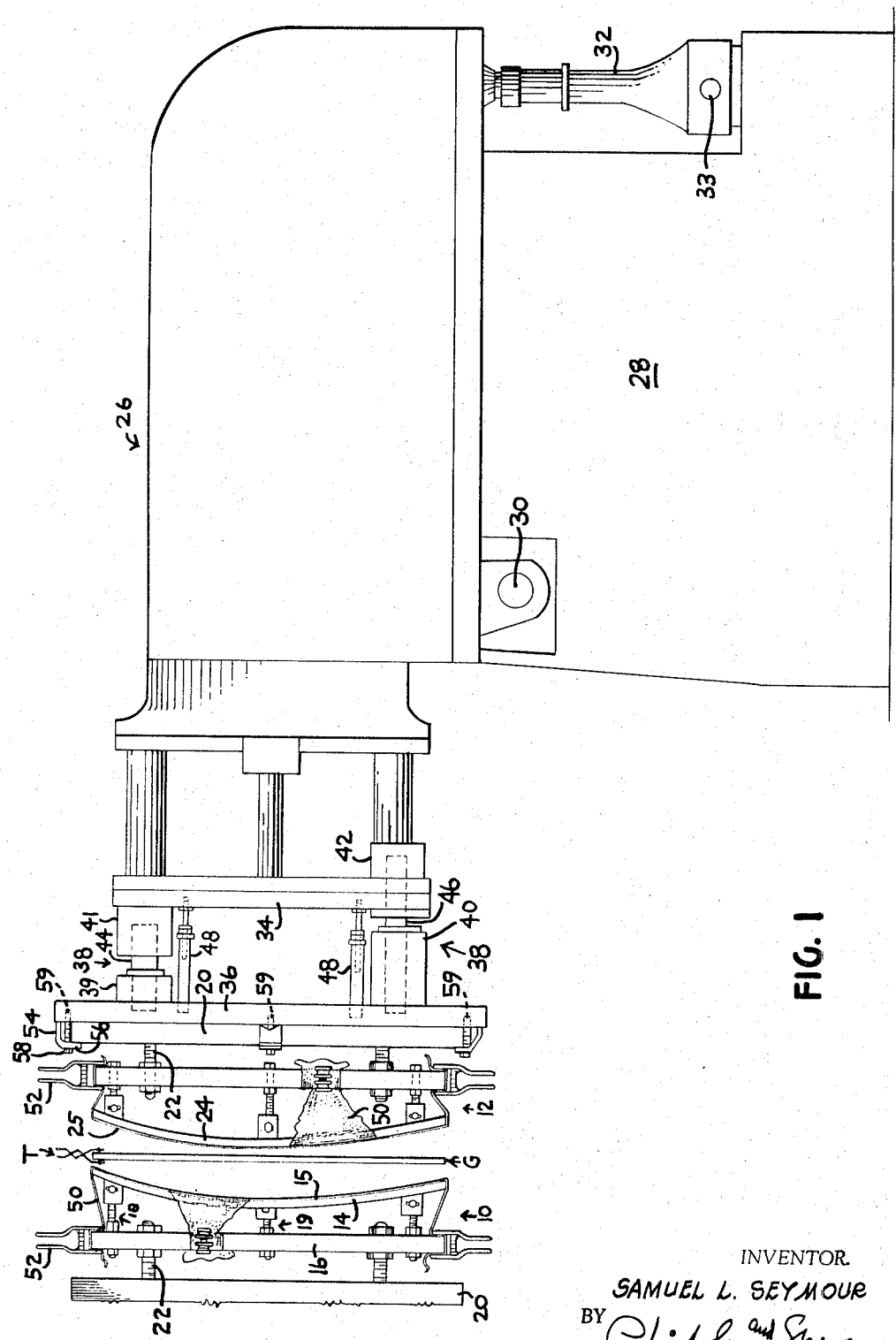

The glass shaping apparatus illustrating the present invention comprises a concave shaping member 10 and a convex shaping member 12. As seen in FIG. 1, the concave shaping member 10 comprises a relatively flexible shaping plate 14, having a concave shaping surface 15 facing forward in one direction. A relatively rigid member in the form of a metal plate 16 is disposed in spaced relation behind the shaping plate 14 by means of a series of attachment means 18 distributed throughout the extent of the plates and additional centrally disposed attachment means 19 to connect one plate to another in a manner to be described in detail later. A rigid back plate 20 is connected in spaced relation to the rigid metal plate 16 by a plurality of rigid, elongated, adjustable connectors 22.

The convex shaping member 12 comprises a relatively flexible shaping plate 24 having a shaping surface 25 complementary to that of the concave shaping member 10. A relatively rigid member in the form of another metal plate 16, attachment means 18 and 19 connecting the relatively rigid metal plate 16 to the rear of and in spaced relation to shaping plate 24, a rigid back plate 20 and connecting means 22 connecting the rigid back plate to the relatively rigid metal plate 16 are associated with the convex shaping member 12 in a manner similar to how the like elements are associated with the concave shaping member 10.

A piston assembly 26 shown in FIG. 1 attached to the rear of convex shaping member 12 is provided for each of the shaping members 10 and 12. Each piston assembly 26 is supported on a piston support structure 28. The shaping member 10 or 12 and its attached piston assembly 26 is pivotally mounted about a pivot 30. A vertically adjustable piston 32 whose housing is pivotally mounted to the piston support 28 at pivot 33 supports the rear end of piston assembly 26. Vertical adjustment of piston 32 permits the entire shaping member and its actuating piston assembly 26 to pivot with respect to the axis of pivot 30 to orient the shaping members in a manner well known in the art. This enables the shaping surface of the member to be oriented at any angle desired with respect to the vertical plane in which a glass sheet G is suspended from tongs for the shaping operation.

The front end of the piston assembly 26 is attached to a piston actuated plate 34. The latter is aligned with a piston plate 36 through a plurality of alignment couplings 38. The alignment couplings 38 between plates 34 and 36 comprise guide blocks 39 and 40 attached to the rear of plate 36 and guide blocks 41 and 42 aligned axially with guide blocks 39 and 40, respectively, and attached to plate 34. Rods 44 extend loosely between aligned guide blocks 39 and 41, while rods 46 extend loosely between aligned guide blocks 40 and 42. A spring loaded coupling 48 is connected between the piston actuated plate 34 and the piston plate 36 in the vicinity of each alignment coupling 38.

Each shaping member is provided with a cover 50 in direct contact with the shaping surface 15 or 25. The cover 50 is preferably of a material that does not harm glass at elevated temperatures. Preferably, the material for the cover is a stretchable fiber glass cloth composed of texturized yarns. A number of closely spaced clamps 52 are mounted around the periphery of the relatively rigid metal plate 16 to clamp the cover 50 in position where it is in unwrinkled condition against the shaping surface 15 or 25 which it covers.

While the present invention is susceptible of making slight modifications in the shaping surfaces by changing the contour of the relatively flexible shaping plates 14 and 24 in a manner to be described in great detail subsequently, it is also desirable to provide means for rapidly changing from one glass shaping member to another when the pattern to be manufactured differs radically from one previously manufactured. This rapid change is accomplished by utilizing a series of brackets 54 having an L-shape in cross section and provided with a flange 56 extending over the marginal portion of the front surface of each rigid back plate 20. Flange 56 is apertured to receive a bolt 58 threaded into a threaded recess 59 contained in plate 36. Thus, the rigid back plate 20 of each shaping member 10 or 12 may be quickly clamped to the piston plate 36 and replace with another member having the desired configuration when a radical change in pattern is called for.

The above construction is far easier to replace than heavy massive solid shaping members used previously.

FIGS. 4 through 9 show enlarged views of attachment means 18 and 19 attached to different portions of convex shaping member 12. FIGS. 4 to 6 show different attachment means 18 and 19 along different parts of an axis of relatively sharp bending, with FIGS. 4 and 6 showing attachment means opposite side edges of the sharply bent shaping surface expanded to the maximum thermal expansion anticipated during a mass-production press bending cycle and FIG. 5 showing a centrally located attachment means 19.

FIGS. 7, 8, and 9 disclose the orientation of the relatively flexible metal plate 24 along different portions of a relatively shallow bend transverse to the sharp bend.

Figure 2:
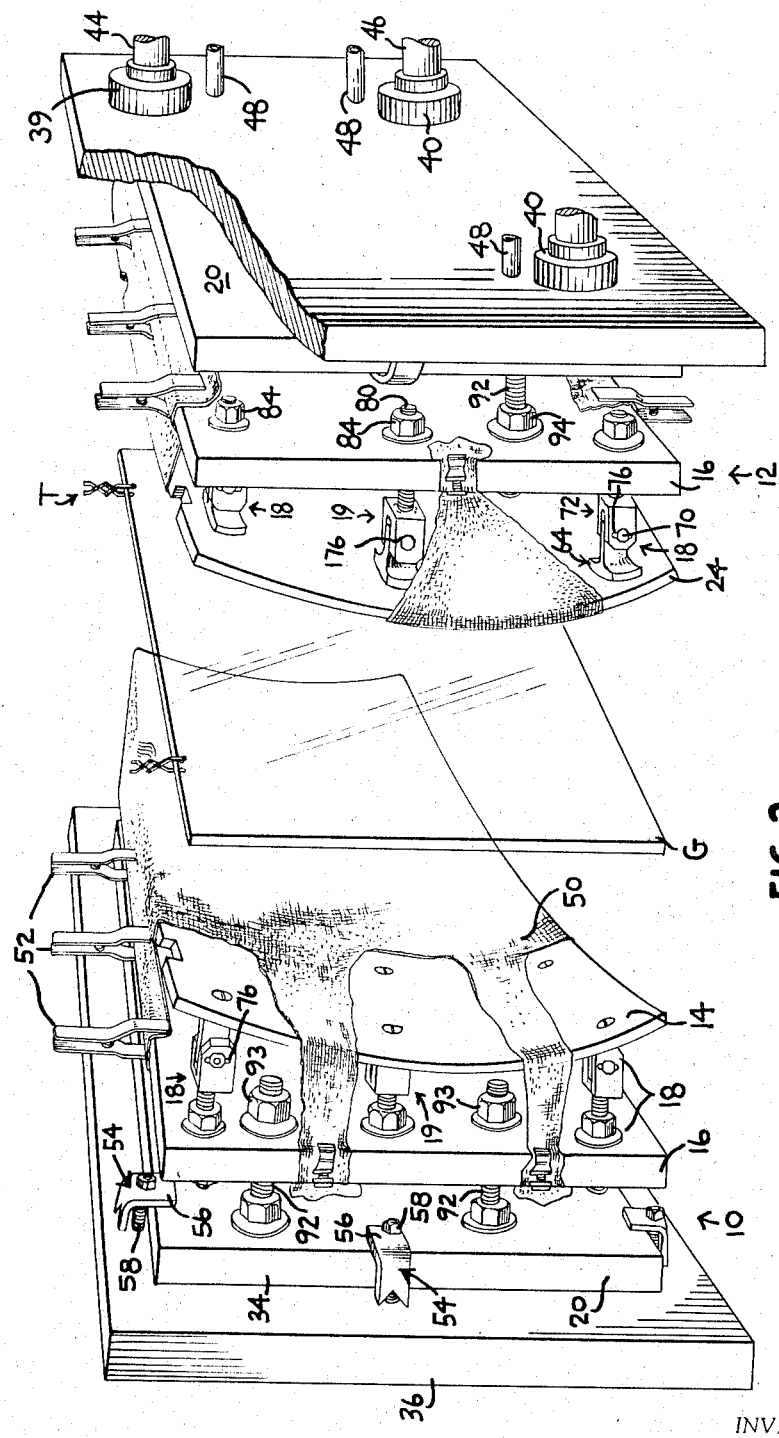
FIG. 2 is a perspective view of the apparatus of FIG. 1 showing the glass shaping mechanism with part of its cover removed to disclose further elements of the construction and with a glass sheet suspended by tongs between a pair of shaping members.

The compound bend shown in FIG. 2 popular in today's automobile side lights, involves a relatively sharp bend (about a 60 inch radius of curvature) about a horizontal axis and a comparatively shallow bend (about a 1440 inch radius of curvature) about a vertical axis. As will be described below, the jointed attachment means 18 and 19 between the shaping plate 14 or 24 and the rigid back plate 16 are constructed to permit a comparatively wide latitude of pivoting about an axis of relatively sharp bending and a comparatively little freedom of pivoting about an axis of shallow bending.

To accomplish this, each shaping plate 14 and 24 is provided with tapered apertures 60 of circular cross section, each having its widest portion at the shaping surface 15 or 25 and tapering in diameter to a minimum diameter at its rear surface. Each tapered aperture 60 is adapted to receive a threaded screw 62 having a tapered head 62 slotted at 63. The tapered head 62 fits within the recess provided by the tapered aperture 60. When in operating position, its widest flat slotted portion is disposed slightly beneath the mean datum plane of the shaping surface 25.

The screw 61 is employed to attach rigidly a T-shaped member 64 to the rear surface of shaping plate 24. T-shaped member 64 comprises a cross bar portion 66 and a stem 68. A threaded recess in its cross bar portion 66 receives the threaded shaft of screw 61. The T-shaped member 64 also comprises a stem 68 which is apertured to receive a pin 70.

A clevis-like member 72 comprising a pair of slotted walls 73 and 74 for the attachment means 18 and a connecting web 75 receives pin 70 through the slots 76 of slotted walls 73 and 74 in such a manner that the stem 68 of the T-shaped member 64 is pivotally mounted on the pin 70 between the slotted walls 73 and 74. Pin 70 has an enlarged head 77 at one end and is externally threaded at its other end to receive a nut 78 to prevent the pin 70 from disengagement from the clevis-like member 72. An externally threaded shaft 80 is secured at one end by welding, for example, to the rear of web 75. The other end of shaft 80 receives a pair of lock nuts 82 and 84, a pair of washers 86 and 88 and a lock washer 90. The externally threaded shaft 80 is mounted through an aperture of rigid plate 16 with washers 86 and 88 disposed on the opposite sides of the relatively rigid plate 16.

The centrally disposed attachment means 19 are similar in construction to the other attachment means 18 with one exception. Walls 73 and 74 of clevis member 72 of the centrally disposed attachment means 19 are provided with circular apertures 176 making a snug fit around pins 70 instead of loosely fitting slotted apertures 76. Thus, the centrally disposed attachment means 19 serve as relatively rigid attachment members by which the central portion of each shaping plate 14 and 24 is fixed in a predetermined position of alignment with respect to its attached back plate 20.

In other words, the tight fit of the elements of at least two centrally disposed attachment means 19 provided by the circular apertures 176 fitting around pins 70 insures that the shaping plates 14 and 24 remain in positive alignment with one another despite their tendency for thermal expansion during a mass-production press bending operation.

In FIGS. 4 and 6, the pins 70 are shown in the position they occupy at the maximum expansion permitted. The length of slots 76 is longer than necessary to compensate for the thermal expansion of the shaping plates, which are heated to an elevated temperature by intermittent contact with heat-softened glass, while the rigid back plates remain relatively cool due to their spacing from the hot glass.

The connecting means 22 connecting the relatively rigid metal plate 16 in spaced relation to the rigid back plate 20 comprises a series of threaded rods 92 (FIG. 2) attached at their rear end to plate 20 and with their forward end extending through apertures in plate 16. A pair of lock nuts 93 and 94 (FIG. 2) and washers rigidly secure the front end of each threaded rod 92 to the front and rear surface of plate 16, respectively, to secure plates 16 and 20 in adjustably spaced relation to one another.

The purpose of spacing the rigid plates 16 from the shaping plates 14 or 24 is to provide access for tools to adjust the length of the adjustment means 18 and 19. The latter interconnect different portions of the plate 16 which is relatively rigid and the relatively deformable shaping plate 24 or 14. By adjusting the location of the lock nuts 82 and 84 along the externally threaded shaft 80, stresses are established in the relatively flexible metal shaping plate 14 to 24 to adjust their respective shaping faces 15 and 25 locally to the shape desired for the glass to be bent without changing the contour of the relatively rigid plate.

While the terms "relatively flexible" and "relatively rigid" have been used to describe the metal plates forming part of the present apparatus, it is understood that the rigidity and the flexibility of the metal plates are with respect to one another and that the relatively flexible metal plates are substantially rigid compared with the rigidity of a heat-softened glass sheet which undergoes shaping by sandwiching the sheet between a pair of shaping members in pressurized contact. The rigidity of the shaping plates 14 and 24 is enhanced by the rigidity of the attachment means 18 and 19 along its axis extending between the shaping plate and the rigid plate 16.

In a typical apparatus for bending glass sheets up to thicknesses of ¼ inch, the relatively flexible plates 14 and 24 were constructed of ¼ inch thick hot rolled steel plates that had been shaped previously to a 60 inch radius bend about one axis and a 1440 radius bend about the other axis. The relatively rigid metal plates 16 were slightly larger in area than the shaping face of the relatively flexible shaping plates 14 and were formed of ½ inch thick cold rolled #1018 carbon steel. The latter imparted stiffness and rigidity to the entire assembly.

Further rigidity for the relatively flexible shaping member was provided by the reinforcement provided through the attachment means 18 and 19 which interconnected the relatively flexible metal plate 14 or 24 and the relatively rigid metal plate 16. Thus, the relatively flexible metal plates 14 and 24 which provide the pressing faces 15 and 25, respectively, whose shape approximates that of the shape desired for glass sheet after bending had sufficient rigidity to resist deformation during pressurized engagement against the opposite surfaces of heat-softened glass sheets.

Some of the required features of the construction of the attaching means 18 which interconnect the noncentral regions of the ¼ inch thick shaping plates and the noncentral regions of the ½ inch thick rigid plate is the slots 76 in walls 73 and 74 extending normal to the axis of sharpest bending to provide room for the ¼ inch thick shaping plate to expand freely without warping in response to the relatively intense heating it undergoes during mass-production operations compared with the relatively mild heating the rigid plate experiences. In addition, pin 70 fits loosely through the aperture in apertured stem 68 to permit some slight freedom of movement for the shaping plate about the shallow axis of curvature.

Even though the jointed members of the attachment means 18 have some freedom of movement to compensate for differences in thermal expansion of the shaping plates relative to the rigid back plate 16, the joined members are rigid in the direction of the thickness of plate 16. Centrally disposed attachment means 19 are even more rigid because their pins 70 fit snugly in aperture 176. This rigidity is important because the shaping plate has very little structural strength by itself to resist a bending stress. This ease of bending the steel shaping plates to a desired configuration initially permits slight changes in its configuration by adjusting the length of the jointed members 64, 72 comprising the individual attachment means 18 and 19.

The attachment means permit the shaping plates or face plates 14 and 24 to be fabricated to the approximate curve desired. These approximate shapes are then adjustable by locating the attachment means at strategically located positions behind the curved shaping plates or face plates 14 and 24. The attachment means 18 hold the curved face plates 14 and 24 sufficiently rigid to withstand without deformation the pressure strains arising during continuous production of bent glass sheets. This plate rigidity with freedom of movement responsive to heat stresses is obtained through engineering design of the assembly of the attachment means and by the number, location, and spacing of the adjustment screws 80 forming part of the attachment means 18. Each curved configuration must be analyzed as to the best location, spacing, and orientation of slots to permit the screws to provide satisfactory production.

For example, the T-shaped members 64 should be oriented in such a manner that the elongated slots 76 extend normal to the axis of sharpest bending. In the case of a cylindrical bend about a horizontal axis, the slots extend vertically. In bending television cover plates to uniform spherical shapes, the slots should extend radially from the central portion of the shaping member. For more complicated bends, different orientations may be required in different locations for best results.

A typical preferred embodiment of the present invention has been described for purposes of illustration. It is understood that various changes may be made from the illustrative preferred embodiment without departing from the spirit of the invention as defined in the claimed subject matter which follows. Some of these modifications may include using one piston to actuate one shaping member only instead of actuating both shaping members, orienting the shaping members to shape horizontally supported heat-softened glass sheets, shaping glass sheets supported by their bottom edge or by gaseous support in either horizontal or vertical or oblique orientation and many other well-known modifications of glass shaping apparatus wherein the present invention is susceptible of use.

What is claimed is:

1. In apparatus for bending a heat-softened glass sheet by sandwiching said glass sheet in pressurized engagement between glass facing surfaces of a pair of glass shaping members having complementary shaping surfaces conforming substantially to the shape desired for the bent glass and relatively movable between a retracted position and a glass engaging position, a glass shaping member comprising:
   (1) a relatively flexible, solid, continuous metal plate having a major surface whose shape and areal extent approximates that of the shape and areal extent desired for the glass sheet after bending and having sufficient rigidity to resist deformation during pressurized engagement against a heat-softened glass sheet,
   (2) a relatively rigid member having an area substantially coextensive with that of said relatively flexible metal plate located in spaced relation behind an in facing relation to said relatively flexible metal plate,
   (3) attachment means comprising a plurality of attachment members distributed in spaced relation throughout the areal extent of said relatively flexible metal plate and said relatively rigid member for connecting said plate and said member in spaced relation to one another, said attachment members being individually adjustable in length between said relatively flexible metal plate and said relatively rigid member for altering the shape of said relatively flexible metal plate relative to said relatively rigid member,
   (3a) at least two of said attachment members comprising relatively rigid attachment members interconnecting the central portion of said relatively flexible plate to the central portion of said relatively rigid member to fix said central portions in a predetermined position of alignment, and
   (3b) the remainder of said attachment members comprising jointed attachment members disposed outward of said relatively rigid attachment members, said jointed attachment members each having a joint movable with respect to at least two axes, said jointed attachment members being rigidly connected in the direction of the thickness of said relatively flexible metal plate and having a looseness at their joints to permit said relatively flexible metal plate freedom of movement along said axes to permit thermal expansion in response to the relatively intense heating it undergoes during mass production operations compared with the relatively mild heating the relatively rigid member experiences, and
   (4) a cover of flexible refractory fabric covering said shaping surface of said relatively flexible metal plate.

2. In apparatus as in claim 1, wherein said relatively rigid attachment members comprise a first connecting member rigidly attached to said relatively flexible metal plate and extending toward said relatively rigid member and a second connecting member rigidly attached to said relatively rigid member and extending toward said relatively flexible metal plate and means snugly connecting said first connecting member to said second connecting member of a pair of said relatively rigid attachment members attached to the central portion of said plate to insure maintenance of alignment between the central portion of said relatively flexible metal plate and the central portion of said relatively rigid member, said jointed attachment members comprising first and second connecting members attached to said relatively flexible plate and said relatively rigid member outward of said relatively rigid attachment members and means loosely coupling said first connecting member to said second connecting member of said jointed attachment members to permit thermal expansion of the outer portions of said relatively flexible metal plate relative to said relatively rigid member with a minimum deviation of said major surface of said relatively flexible plate from said shape.

3. In apparatus as in claim 2, wherein said jointed attachment members comprise a slotted member as one of said connecting members, an apertured member as the other of said connecting members and a pin extending loosely through the slot of said slotted member and the aperture of said apertured member to permit relative thermal expansion and contraction of said relatively flexible metal plate relative to said relatively rigid member while providing rigidity along an axis extending between said relatively flexible metal plate and said relatively rigid member.

4. In apparatus as in claim 3, wherein the major surface of said relatively flexible metal plate defines a compound curvature including a relatively sharp bend about one axis of curvature and a relatively shallow bend about another axis of curvature, and where said slotted members are provided with elongated slots oriented with their longest dimension extending transverse to said one axis of curvature.

5. In apparatus as in claim 3, wherein the major surface of said relatively flexible metal plate defines a spherical shape, and wherein said slotted members are provided with elongated slots oriented with their longest dimension extending radially from the central portion of said relatively flexible plate.

6. In apparatus as in claim 1, wherein said jointed attachment members are arranged in spaced rows to provide access for an adjustment tool.

7. In apparatus as in claim 1, further comprising a plunger for actuating said glass shaping member for movement between said retracted position and said glass engaging position, a plate attached to said plunger and means connecting said last named plate to said relatively rigid member in spaced relation thereto, said last named space providing access for adjusting said attachment means for connecting said relatively rigid member and said relatively flexible metal plate.

References Cited
UNITED STATES PATENTS
2,570,309   10/1951   Black _____ 65—287 X
3,123,459   3/1964   Hens _____ 65—106

DONALL H. SYLVESTER, *Primary Examiner.*

A. D. KELLOGG, *Assistant Examiner.*